US008069772B1

(12) United States Patent
Peterson

(10) Patent No.: US 8,069,772 B1
(45) Date of Patent: Dec. 6, 2011

(54) SYSTEMS AND METHODS FOR CONTROLLING HYDRAULIC ACTUATORS

(76) Inventor: Arnold Peterson, Lake Balboa, CA (US)

( * ) Notice: Subject to any disclaimer, the term of this patent is extended or adjusted under 35 U.S.C. 154(b) by 657 days.

(21) Appl. No.: 12/141,803

(22) Filed: Jun. 18, 2008

(51) Int. Cl.
*G05B 19/19* (2006.01)
*F15B 9/03* (2006.01)

(52) U.S. Cl. .......................................... 91/361; 91/459

(58) Field of Classification Search ................ 91/1, 361, 91/362, 459; 92/5 R
See application file for complete search history.

(56) References Cited

U.S. PATENT DOCUMENTS

| | | | | |
|---|---|---|---|---|
| 4,235,156 | A * | 11/1980 | Olsen | 91/363 R |
| 4,313,074 | A * | 1/1982 | Nomura et al. | 318/608 |
| 4,315,198 | A * | 2/1982 | Lin et al. | 318/594 |
| 4,756,229 | A * | 7/1988 | Drakeley | 91/361 |
| 4,777,798 | A * | 10/1988 | Jacobson et al. | 91/362 |
| 4,901,625 | A * | 2/1990 | Bussan et al. | 91/361 |
| 4,951,549 | A * | 8/1990 | Olsen et al. | 91/363 R |
| 5,012,722 | A * | 5/1991 | McCormick | 91/361 |
| 5,023,535 | A * | 6/1991 | Miller et al. | 91/362 |
| 5,383,390 | A * | 1/1995 | Lukich | 91/361 |
| 5,832,806 | A * | 11/1998 | Nelson | 91/361 |
| 6,124,696 | A | 9/2000 | Rademacher et al. | |
| 6,140,793 | A | 10/2000 | Carr et al. | |
| 6,142,059 | A * | 11/2000 | Chan et al. | 91/361 |
| 6,150,789 | A | 11/2000 | Pulford, Jr. | |
| 6,339,306 | B1 | 1/2002 | Hara | |
| 6,462,502 | B1 | 10/2002 | Inui et al. | |
| 6,563,285 | B1 | 5/2003 | Eade et al. | |
| 6,731,092 | B2 | 5/2004 | Shimazaki | |
| 6,756,749 | B2 | 6/2004 | Haas et al. | |
| 6,778,367 | B1 | 8/2004 | Grendene | |
| 6,806,675 | B2 | 10/2004 | Wang et al. | |
| 6,834,574 | B2 * | 12/2004 | Neumann | 91/1 |
| 6,853,162 | B2 | 2/2005 | Betts et al. | |
| 6,861,818 | B2 | 3/2005 | Foster et al. | |
| 6,870,346 | B2 | 3/2005 | Davidov | |
| 6,903,531 | B2 | 6/2005 | Suomi et al. | |
| 6,918,357 | B2 | 7/2005 | Norris | |
| 6,979,972 | B2 | 12/2005 | Carolan | |
| 7,047,865 | B2 * | 5/2006 | Neumann | 91/1 |
| 7,049,785 | B2 | 5/2006 | Han | |
| 7,062,832 | B2 * | 6/2006 | Yo et al. | 29/407.08 |
| 7,116,074 | B2 | 10/2006 | Kuo | |
| 7,170,254 | B2 | 1/2007 | Yamada | |
| 7,224,140 | B2 | 5/2007 | Arefeen et al. | |
| 7,239,108 | B2 | 7/2007 | Best | |
| 7,345,447 | B2 | 3/2008 | Doutney et al. | |
| 2006/0144217 | A1 * | 7/2006 | Neumann | 91/1 |

* cited by examiner

*Primary Examiner* — Thomas E Lazo
(74) *Attorney, Agent, or Firm* — Knobbe, Martens, Olson & Bear LLP

(57) ABSTRACT

Methods and systems for controlling a hydraulic motor are described. By way of illustration, a motor control system has a first input configured to receive a step/direction command signal. A second input is configured to receive a position signal from a motor position sensor, such as a continuous turn motion sensor coupled to a hydraulic motor. A processing system is configured to control a hydraulic servo valve based at least in part on the step/direction command signal and the position signal.

36 Claims, 12 Drawing Sheets

SYSTEMS AND METHODS FOR CONTROLLING HYDRAULIC ACTUATORS

CROSS-REFERENCE TO RELATED APPLICATIONS

This application is related to applicant's co-pending application Ser. No. 12/141,863 entitled HYDRAULIC CONTROL SYSTEMS AND METHODS, Filed Jun. 18, 2008.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention relates to motor control, and in particular, to methods and systems for controlling a hydraulic actuator, such as a hydraulic motor.

2. Description of the Related Art

Conventional techniques do not adequately provide for the accurate control of a hydraulic motor. Further, conventional systems for hydraulic motor are typically limited to direct velocity only control, or analog based rotational transducers. Disadvantageously, direct velocity controls often require the operator to eyeball the position, which is neither very accurate nor repeatable. The analog based rotational feedback controls have limited resolution, and require "unwinding" back to a start position to zero the system. Further, analog based hydraulic motor control systems often seek to a startup position (e.g., upon turn-on), which can be very hazardous, in the event someone is in proximity of the motor while the seek operation is performed.

SUMMARY OF THE INVENTION

Certain example embodiments described herein enable the accurate control of a hydraulic actuator using step/direction commands, such as those used for stepper motor control. Further, certain embodiments can be controlled via position and/or velocity commands. In addition, certain embodiments receive position information from a continuous turn encoder. Thus, for example, certain embodiments enable a stepper motor type control system to be used to operate a hydraulic motor with high precision, optionally using relatively large number of steps with relatively small step increments.

An example embodiment provides a hydraulic motor control system, comprising: a first input configured to receive a digital step/direction command signal; a second input configured to receive a position signal from a continuous turn motor position sensor; and a processing system configured to control a hydraulic servo valve based at least in part on the step/direction command signal and the position signal.

An example embodiment provides a hydraulic motor control system, comprising: a first input configured to receive a digital step/direction command signal; a second input configured to receive a position signal from a position sensor; and a processing system configured to control a hydraulic servo valve based at least in part on the step/direction command signal and the position signal.

An example embodiment provides a method of controlling a hydraulic motor, comprising: receiving step command pulses; keeping a count of the step command pulses; receiving position information from a position sensor coupled to a hydraulic motor; and using the count of step pulses and the position information to control a hydraulic servo valve coupled to the hydraulic motor, to thereby at least partly control the hydraulic motor.

An example embodiment provides computer executable code stored in a computer readable memory, that when executed is configured to: receive a count of step command pulses; receive position information from a continuous turn incremental position sensor coupled to a hydraulic motor; and use the count of step pulses and the position information to control a hydraulic valve coupled to the hydraulic motor, to thereby at least partly control the hydraulic motor.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

DETAILED DESCRIPTION OF PREFERRED EMBODIMENTS

Figure 1:
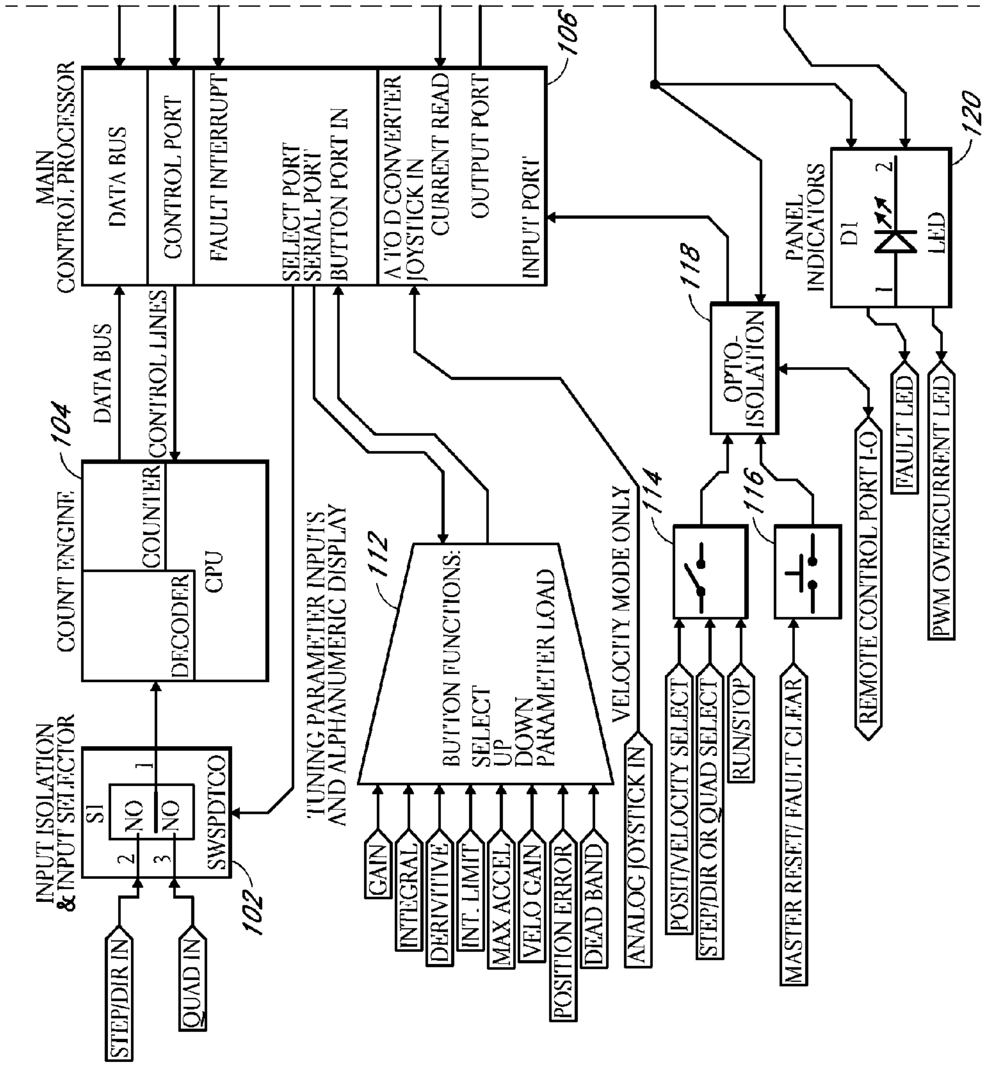
FIG. 1 illustrates an example hydraulic actuator control system.
Figure 1:
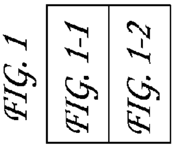

Certain example embodiments enable the accurate control of a hydraulic actuator, such as a rotational hydraulic motor, using step/direction commands, such as those used for stepper motor control. Thus, for example, certain embodiments enable a stepper motor type control system to be used to operate a hydraulic motor with high precision. In particular, certain optional embodiments enable the hydraulic actuator to be controlled/rotated via a relatively large number of steps.

Certain embodiments can optionally be used in a variety of applications, including, but not limited to, the motion picture industry or construction industry for use on turntables, winches, gimbals, elevators, cranes, and other hydraulic applications, including, but not limited to, those that are particularly safety sensitive. Certain embodiments can optionally be used as a stand alone device that does not require a host computer to operate.

Certain embodiments of a motor controller accept control digital inputs or control analog inputs via a joystick, such as an analog joystick, or from a digital-to-analog converter output from a control computer.

By way of illustration the feedback signals may be associated with an incremental, continuous turn optical sensor (e.g., using a light shining onto a photodiode through slits in a metal or glass disc or reflecting from lines on a disc), a magnetic sensor (e.g., using strips of magnetic material positioned on a rotating disc and sensed by a Hall-effect sensor, a magnetoresistive sensor, or other sensor) or gear based position sensor (e.g., that converts the angular position of a shaft/axle to an analog or digital code. Optionally in addition or instead, an absolute position sensor can be used. Optionally an incremental position sensor (to provide relative position information) can be used in combination with a home sensor. Thus, for example, the motor can be moved until the home sensor indicates that the motor is in the home position, and the relative position sensor can then be used to determine the position relative to the home position.

As referred to above, certain embodiments are utilized in a servo controlled hydraulic system to thereby reduce or eliminate uncontrolled axis movement. Certain embodiments provide for safe controlled initiation and seeking of initial position, to thereby avoid an axis dangerously jumping to a zero/initial position.

Certain embodiments include some or all of the following safety circuits and mechanisms:

- isolated relay driven valve enables and port lock outputs;
- a master valve enable failsafe relay is provided for safe shutdown in case of emergency failure;
- in order to reduce electrical noise, optionally DC power (e.g., 24 VDC or other voltage level) isolated for logic and valve supplies is provided.

Certain example inputs will now be described. Optionally, some or all of the inputs are opto-isolated to protect the circuitry. An example embodiment includes one or more analog and/or digital control and signal inputs. For example, the input circuitry optionally includes analog buffers, integrators, and signal conditioner. One or more transducer inputs are optionally provided that receive inputs from one or more transducers (e.g., coupled to one or more hydraulic motors). The transducer inputs optionally include transducer analog buffers and signal conditioners.

An example embodiment includes a processor with an internal and/or external analog to digital converter, and/or a digital to analog converter. The digital to analog converter optionally includes a latch for the digital input, and an analog output buffer. The processor optionally includes input and/or output parallel and/or serial control ports. An example embodiment includes one or more relay output drivers and output relays, optionally with dedicated power to further enhance safety.

An example embodiment includes one or more controls, including manually operated controls (e.g., toggle switches, rotary switches, push button switches, touch-sensitive switches), optionally opto-isolated, including some or all of the following, which are described in greater detail with reference to FIG. 1:

- position/velocity, step direction or quadrature, and run/stop selection switches;
- a reset/fault clear switch;
- an analog and/or digital joystick;
- tuning parameter controls;

Referring now to FIG. 1, an example embodiment is illustrated, including optional features. Other embodiments can include fewer, additional, or different features and circuits. For example, the functionality provided by processors 104, 106, 108 can optionally be provided by a single processor. By way of further example, the functions described herein can be distributed differently across the processors. Fewer or additional processors may be used. Further, while the illustrated system is processor based, wherein the processor executes software code stored in memory or other computer readable medium, optionally other circuitry, such as state machines can be used instead or in addition.

The illustrated embodiment provides precision control of a rotary or linear axis. The illustrated embodiment can be used to control one axis. Multiple instances can be used to control multiple axes. Optionally, a single instance of the illustrated circuit can be used to control multiple axes (e.g., where inputs and outputs for different channels can be multiplexed to the processors or coupled directly to different ports).

Position and/or velocity commands may be received from a step direction command source and/or a quadrature command source. As will be described in greater detail below, the system may be interfaced to a quadrature encoder connected to a hydraulic motor or cylinder (and/or an electronic motor) to receive positioning information. In addition, the system may control one or more valves via a valve control signal coupled to a servo valve control input.

The system optionally also generates a pulse width control signal, which is mated to a pulse width modulated electric servo drive for control of electric motors. Thus, the system is optionally configured to control hydraulic and/or electric motors.

A user interface is provided (e.g., dedicated control buttons and/or switches on a control panel mounted to an enclosure for the board containing circuitry in FIG. 1, via a wired or wireless remote control with corresponding controls (or fewer or additional controls), or via a computer terminal, such as a personal compute).

The user interface optionally includes a joystick (and/or trackball, touchpad, or mouse). A user accessible enable/disable switch allows for axis freewheeling. A position/velocity control is provided via which the user can specify whether the system is to operate in position mode or velocity mode. Optionally, user adjustable proportional-integral-derivative (PID) loop tuning controls are provided (e.g., in the form of pots or a keyboard via the dedicated control panel and/or a computer terminal, which can be used to specify gain, integral, derivative, etc). Optionally, a user adjustable position error count set point is provided. A reset control is provided for performing a reset and for clearing faults. Controls are provided to set an input control dead band and gain for velocity mode. Position error controls are provided, via which the user can set the number of counts that need to be reached in order for a position error signal to be generated. The system is optionally reverse polarity protected and utilizes opto-isolated step direction inputs and remote inputs for enabling and fault clearing.

An example embodiment includes a relay safety lockout for enabling and disabling servo drive for hydraulic and/or electric servos. The relay safety lockout stops servo runaway, which may occur as a result of position error, which may result from a hydraulic valve or electric servo drive failure (e.g., position error is the trigger, caused by the inability of the servo system to maintain commanded position).

An example embodiment of the system can optionally accommodate an input pulse train of 120,000 pulses per second, as well as lower rates and higher rates (e.g., depending on the performance of one or more of the processors). Example resolutions for the motor encoder input are:

<=500 line encoder on a motor at speeds over 3600 rpm>
<=200 line encoder; on a motor at speeds over 9000 rpm or other resolutions.

The system will now be discussed in greater detail with reference to FIG. 1. Optionally, certain embodiments include inputs configured to receive industry standard 0 to 10v or 4 to 20 ma control signals and/or other voltage/current signals (whether or not industry standard). Optionally, certain embodiments include outputs that conform to the industry standard of 0-10v, 4-20 ma, and/or to other voltage/current signals (whether or not industry standard) to feed hydraulic servo valves and/or linear drives (e.g., hydraulic linear servo valves). A PWM servo drive, with safety lockout relay provides drive signals at 5 to 80 amps, 24 to 160v, or at other currents and voltages. Over current input from the electric servo is provided to enable safe shutdown.

In the illustrated embodiment, the system receives step/direction control inputs and/or quadrature control inputs via an input isolation and selection circuit 102, as similarly discussed above. A processor 106 controls the input selection via a selection port to thereby determine whether step/direction control inputs are to be used (e.g., from a programmable logic controller or general purpose computer) or quadrature control inputs (e.g., from a digital joystick with an encoder, such as an optical encoder) are to be used. The output of circuit 102 is coupled to a count engine 104, which in this example includes a decoder, a central processing unit, and an up/down counter.

With respect to quadrature signals, the count engine 104 quadrature converts the signals into a numeric count of position pulses. The count will increment in one direction and decrement in reversed direction when the user control (e.g., a joystick) is rotating/moving (e.g., as detected by an optical encoder (such as an incremental encoder that generates a pulse for each incremental step), gear, or other motion measurement device that converts linear or rotary displacement into digital or pulse signals). The quadrature decoder determines the direction of rotation via two incoming phase signals, and generates corresponding clock that is used by the position counter. For example, using two code tracks with sectors positioned 90° out of phase, two output channels of the quadrature encoder indicate both position and direction of rotation. If A leads B, for example, a rotation (e.g., of an encoder disk, gear, or other motion measurement device) in a clockwise direction is occurring. If B leads A, then a rotation in the counter-clockwise direction is occurring. Therefore, by monitoring the number of pulses and the relative phase of signals A and B, the position and direction of rotation can be tracked.

When step/direction is selected, the count engine will count the number of step pulses, up or down as indicated by the direction signal.

The count engine counters are optionally read as two words (e.g., 16 bit words), a counter low register and a counter high register. Before a count value is read, the desired counter is selected. Optionally, a read counter command (e.g., issued by the main processor 106) reads a counter latch, rather than the counters directly, to prevent the count from changing during reading (which might give an erroneous result).

The count engine 104 interfaces with the main control processor 106, wherein the output bus of the count engine 104 provides outputs (including counter outputs) to the processor 106, and the processor provides control signals to the count engine 104. For example, the processor 106 can read the counter values from the count engine 104. Optionally, the count engine is configured to reset the counters after a read operation.

Tuning parameter inputs 112 (which may be in the form of manually adjustable potentiometers and/or digital look-up table memory) are coupled to the processor 106. If the tuning inputs are analog in nature, they are coupled to an analog to digital converter and the values are converted to digital values. If the tuning inputs are digital in nature, they are coupled to digital inputs. The tuning inputs can be factory set and/or can be settable/adjustable by an end user (e.g., via a screwdriver or knob in the potentiometer implementation and via a keypad/keyboard/touch interface in the look-up table implementation). The tuning inputs can be provided for some or all of the following:

system (proportional) gain;

integral gain (used to correct for static loading, removes offset caused by loading);

derivative gain (used to add a dampening coefficient to slow response to integral gain);

integral limit, (used to limit total integral amount (and drive voltage), prevents integral "windup" (accrued error), which can cause the motor to go at too high speed, which provides added safety);

maximum desired/allowable acceleration; rate maximum desired/allowable velocity (for use in velocity mode);

velocity gain (for use in velocity mode);

position error;

deadband size.

The analog to digital converter is optionally coupled to an analog joystick producing an analog signal corresponding to joystick motion and/or position.

A selection switch 114 enables a user to select between position/velocity control; step/direction or quadrature; run/stop. The switch 114 is coupled to the processor 106 via an opto-isolator 118. A master reset/fault clear and load parameters switch 116 is likewise coupled to the processor 106 via the opto-isolator 118. The opto-isolator 118 optionally also couples a remote control port (which is optionally coupled to a remote control) to the processor 106.

The processor 106 includes data buses, control signals, and interrupts coupled to a motion control processor 108. The motion control processor 108 can perform some or all of the following functions (via code executed by the processor 108 or via hardware only): trajectory generation, servo-loop compensation, PWM (pulse-width modulation), digital output port for digital to analog converter, and pulse and direction motor-command output generation. Other functions may include digital I/O and analog I/O.

In the illustrated example, the motion processor 108 includes a port coupled to a digital-to-analog converter 110 (which converts the digital output of the port into an analog signal). The digital-to-analog converter 110 is in turn coupled to a valve control, which in turn controls the hydraulic fluid going to the hydraulic motor. The motion processor 108 outputs a pulse width modulated (PWM) signal coupled to an output buffer 124, which is coupled to a motor controller, and to power protection and isolation circuitry 126. The power protection and isolation circuitry 126 is coupled to a set of regulators 128.

The motion processor 108 is connected to a motion/position sensor coupled to the hydraulic motor (e.g., the shaft or something coupled to the shaft for a rotary motor, or coupled to the stage for a linear motor) and tracks (directly or indirectly) motor movement/position. By way of example, the motion/position sensor can be a continuous turn optical encoder (such as an incremental encoder that generates a pulse for each incremental step corresponding to an encoder disk line), gear, or other motion measurement device that converts linear or rotary displacement into digital or pulse signals, The processor 106 includes an output port coupled to a valve enable, PWM relay output control, and fault out circuit 122. The circuit 122 is coupled to the relay enable of the circuit 124 and to a fault indicator light. The disabling of relays prevents motor movement, thereby better ensuring safety. This prevents any motion of the motor should the drive output fail in the "on" position. (e.g., a H bridge short)

The processors 104, 106, 108 execute program code (e.g., used to perform processes described herein), where the program code is stored in internal and/or external computer readable memory.

Figures 1, 4:
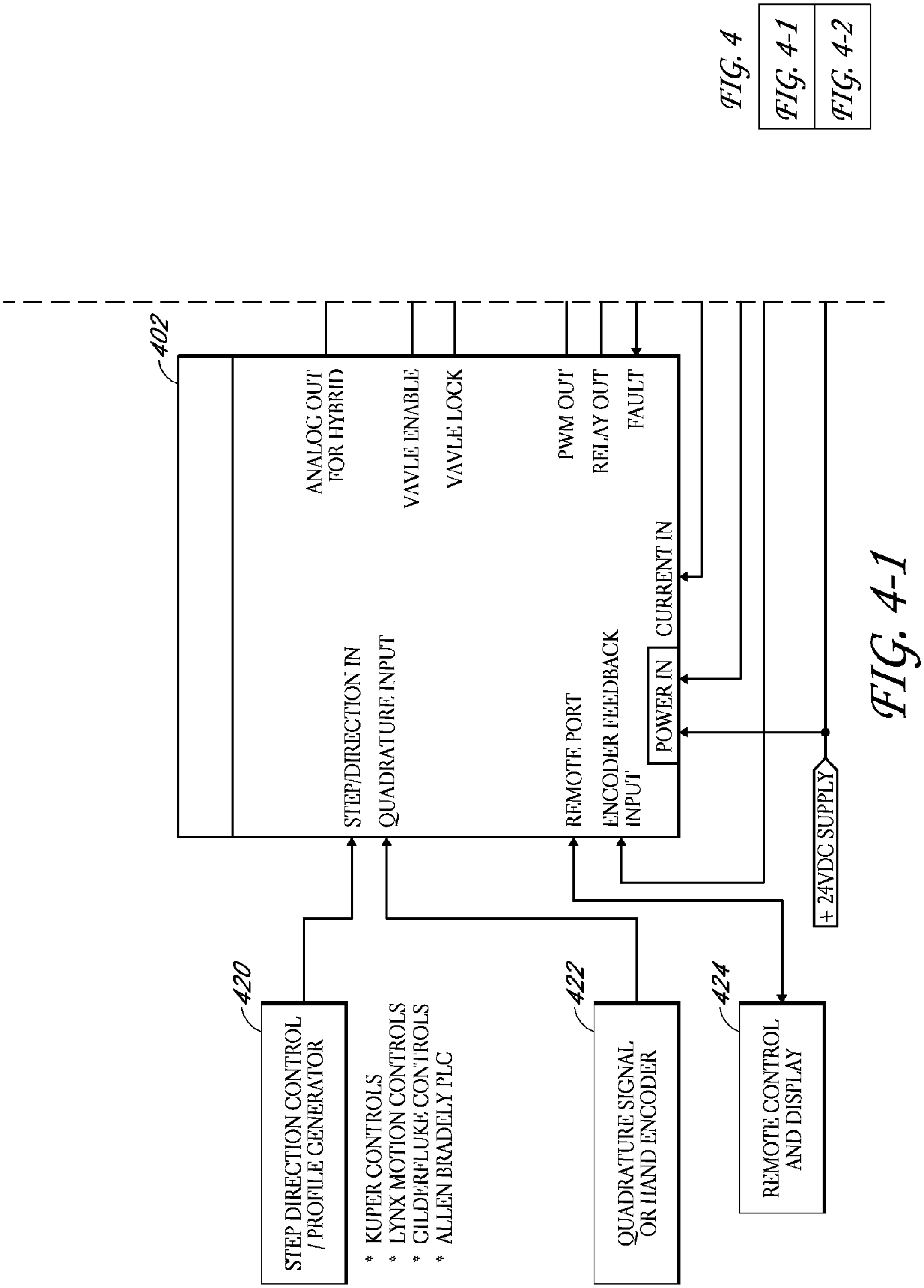
FIG. 4 illustrates an example servo system.
Figures 2, 4:
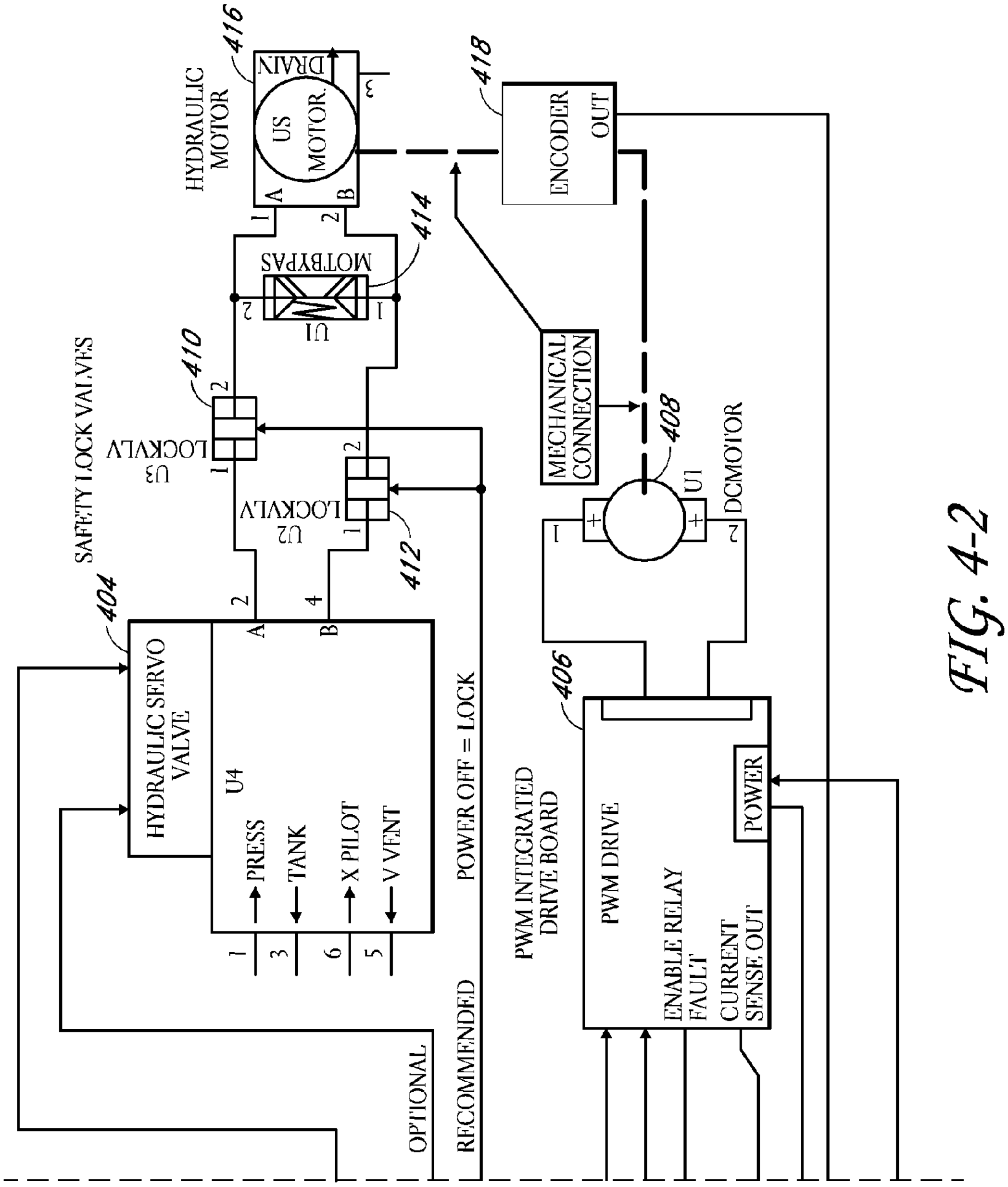

FIG. 4 illustrates an example servo system including the control system illustrated in FIG. 1, which corresponds to control system 402. As illustrated, the control system 420 receives step/direction commands from a step direction control/profile generator 420. Quadrature signals are received from a quadrature signal source 422, such as a user manipulated control (e.g., a joystick). A remote control 424 (optionally including a display and/or indicators) is coupled to a remote port, to thereby provide commands/data and to receive display/indicator information/commands.

The control system 420 includes an analog output port providing analog control signals to a hydraulic servo valve 404. The servo valve 404 ports are coupled to safety lock valves 410, 412, which receive power from the control system 420 (which can power off the lock valves 410, 412 to thereby lock the hydraulic motor to prevent or hinder motion). The safety valves 410, 412 are in turn coupled to the hydraulic motor 416, to thereby control the flow of fluid to the motor 416. A bypass valve 414 is provided for additional safety, by preventing fluid under excessive pressure from damaging the motor 416.

A position encoder 418 (relative or absolute, such as an optical encoder or other encoder described herein, by way of example, which may be a continuous turn encoder which does not have to be re-zeroed on start up) is mechanically coupled to the hydraulic motor 416.

The control system 402 provides PWM output signals and relay enable signals to a PWM drive circuit 406. The drive circuit 406 provides a fault signal to the control system 402 to indicate whether a fault condition has occurred. The output controls of the PWM circuit 406 are coupled to an electronic motor 408, which in turn is mechanically coupled to a position sensor, such as encoder 418.

In an example embodiment, when power is first applied to the circuitry, the relay outputs are cleared. The valves are locked and not enabled (e.g., by clearing the enable outputs) to enhance safety by preventing the hydraulic motor from rotating the motor shaft, or causing a linear motion (as applicable) during the initiation of the motion control processor 108. After the motion control processor 108 has successfully booted up, the count processor 104 is read by the main processor 106, which clears the count processor 104. The tuning parameters are read by the main processor 106, evaluated and loaded into the motion control processor 108.

The main software loop now polls the run/stop control (e.g., which can be a toggle switch, push button, or other control). If the run/stop control indicates a stop state, the valve enable and main drive relay remain off, and the software is in a wait loop (e.g., until a run command is detected). Optionally, a parameter load control is monitored to determine if new tuning values need to be read and loaded to the motion control processor 108.

When the software detects that run/stop control is in the run state, the position/velocity mode control is examined to determine the commanded mode (position or velocity). The input select switch is then examined to determine whether the step/direction signal or the quadrature signal is to be routed to the count processor engine 104. The count engine counter is then set to an initial value (e.g., zero). The software then activates the valve enable and the PWM drive relay (if applicable). The motion control processor 108 is then commanded to close the servo loop and enable the PWM or digital to analog output, as applicable, by the main processor 106.

When a pulse is received, an interrupt cycle is initiated in processor 104. Optionally, the interrupt process is extremely short to thereby prevent or reduce the possibility of lost pulses during the data transfer cycle from the count engine 104 to the main processor 106. Optionally, the count engine 104 runs asynchronously with the main processor 106. For example, using the approach described herein, the count engine 104 can avoid dropping any pulses even at 120,000 pulses per second, although the count engine can handle lower and higher rates.

The main processor 106 polls the count engine 104 (e.g., 750 times per second or at a lower or higher rate). The count is evaluated and the appropriate value is transferred to the motion control processor 108. If the mode is set for position, then the PID, parameters are read and applied to the control loop. If the mode is set for velocity mode, the PID parameters, as well as the gain and dead band control readings, are used are alter the performance of the system. Corresponding setting information is written to the motion control processor 108. In addition, an error count threshold value is written to the motion control processor 108.

The motion control processor 108 optionally is utilized as a closed loop controller that frees up the main processor 106 from the servo loop maintenance details (although optionally, the main processor 106 can handle some or all of the servo loop functionality). If the servo loop exceeds the error count from the main processor 106, then the motion control processor 108 signals an error. The output from the motion control processor digital to analog converter and/or the PWM output will be set to a safe state (e.g., zero) disables the drive relay and valve enable to prevent further motor movement. Optionally, a user needs to activate a reset control to cause the system software to proceed to an initialization routine, clear the error and enable the system to control the motor controls. This reset process can be also be initiated through the remote port from an off site controller or operator.

Optionally, when the position/velocity mode select control is changed from one mode to another, the software proceeds back to the initialization phase. This action clears the count processor 104 and readies the system for operation.

Several example program flow charts will now be described. With respect to the example processes described herein, not all the process states need to be reached, nor do the states have to be performed in the illustrated order. While the following discussion may mention measuring "motor movement" or "motor position", the foregoing phrases should be understood to include measuring the position of a motor shaft or stage as measured directly or indirectly, such as by measuring the motion/position of something coupled to the shaft or stage.

Figures 1, 2:
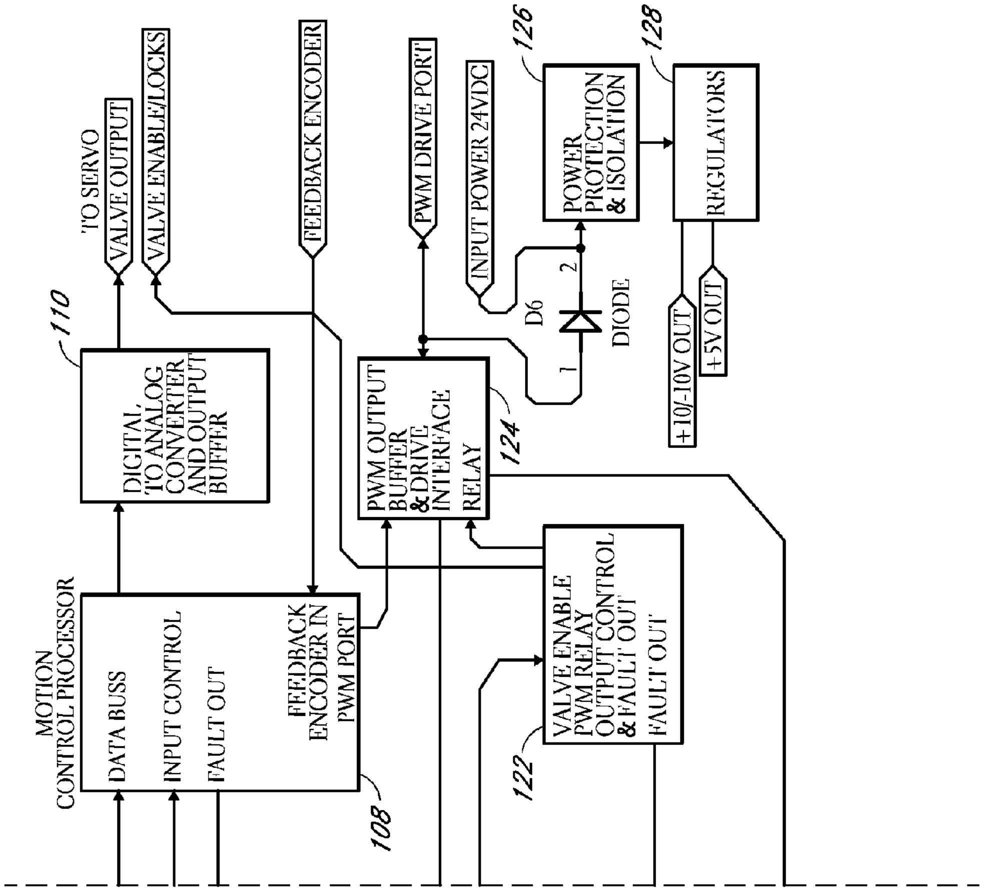
FIG. 2 illustrates an example count engine initialization process.
Figures 1, 2:
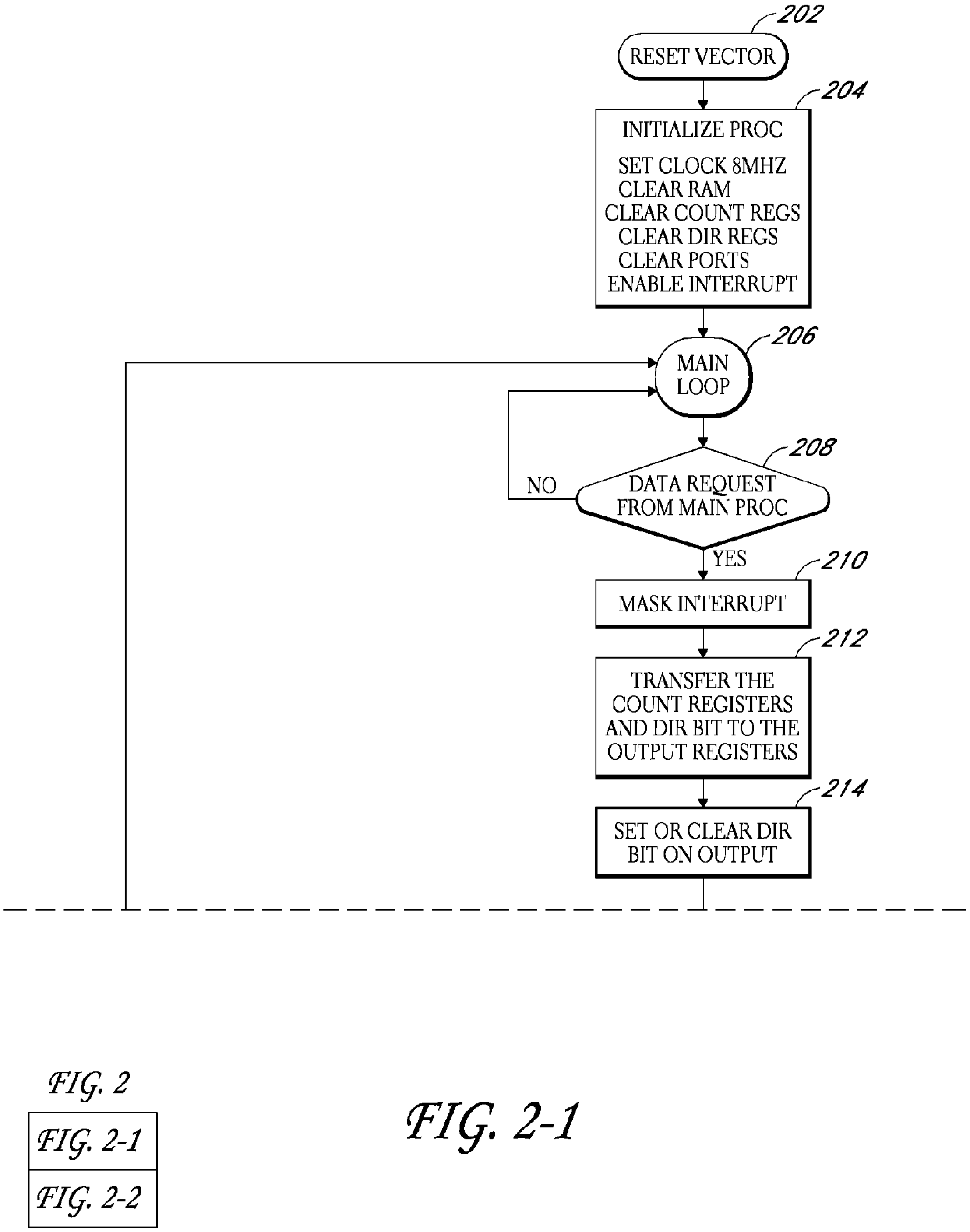
Figure 2:
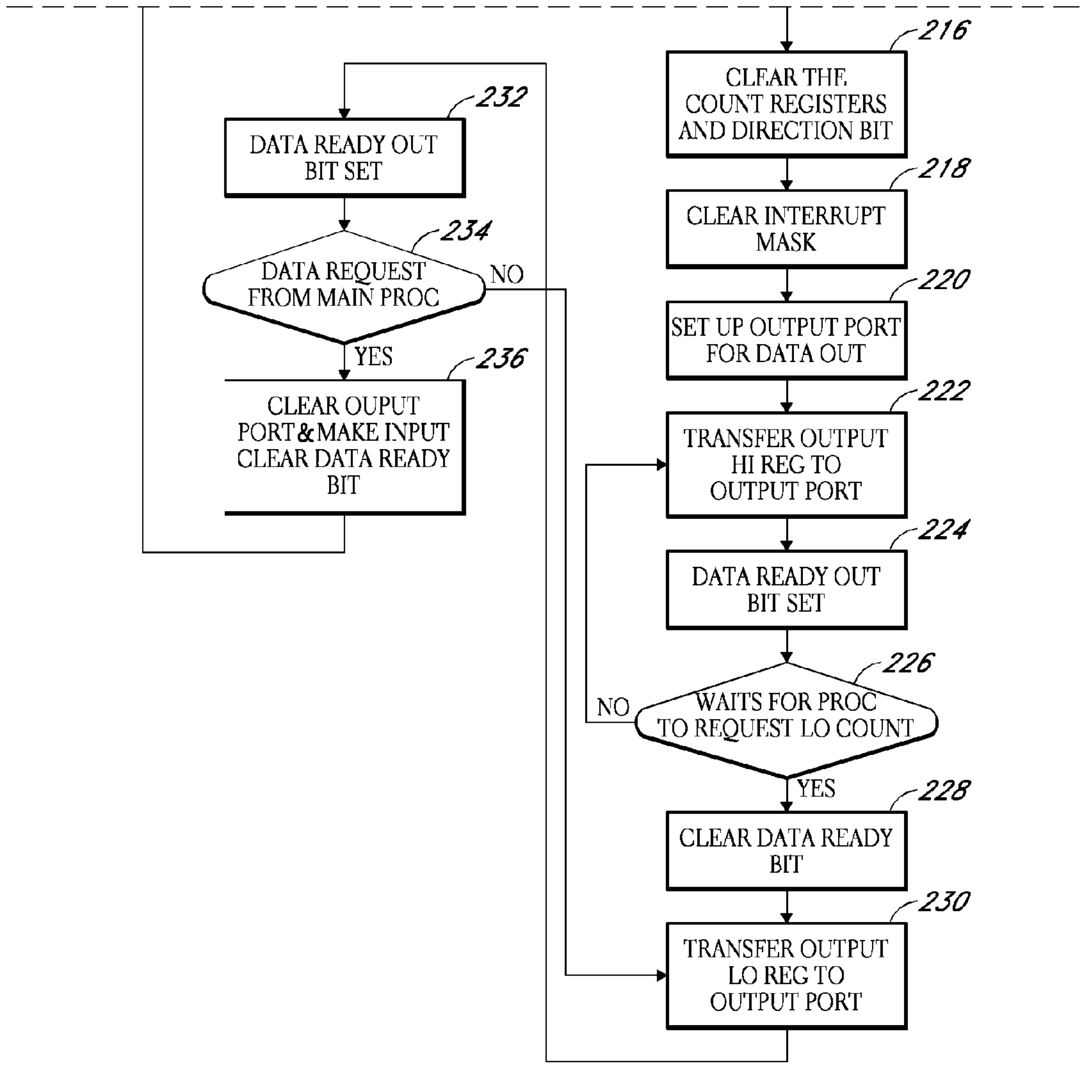

FIG. 2 illustrates an example count engine flow chart. Optionally, the illustrated process occurs asynchronously with respect to the process illustrated in FIG. 5. In this example embodiment, a loop function is provided that optionally is not dependent on the speed of the main processor 106, or dependent on the read cycle timing of the count engine 104 by the main processor 106. In this loop, upon receiving a read request from the main processor 106, the count processor's counter interrupt is masked while the counters and direction bit are latched to the count engine output registers, and the latch is read by the main processor 106 (and the read data is optionally not utilized). The count registers are then cleared. The loop speed can be used to determine, at least in part, the "no drop" pulse rate (e.g., greater than 120,000 pulses per second, although it can optionally be 120,000 or less).

Referring now to FIG. 2, at state 202, the program starts and a reset is generated (e.g., upon power-up, in response to a user reset command, in response to a main processor command, etc.). At state 204, the count engine 104 is initialized, the count engine clock is set (e.g., 8 Mhz or other desired speed), the volatile random access memory is cleared (e.g., by writing all zeros or other appropriate value to the RAM memory locations), the count registers are cleared, the direction registers (which indicate if the counter is in negative or positive count space) are initialized/cleared, (which indicates positive count space) the ports are cleared, and the interrupt is enabled. At state 206, a main loop is executed. At state 208, a determination is made as to whether a read data request has been received from the main processor 106. If a request has been received, the process proceeds to state 210, otherwise the process loops back to state 206.

At state 210, the count engine interrupt is masked. At state 212, the count registers and direction bits are communicated to the output registers. At state 214, the output direction bit (defining up or down count to main processor 106), is set or cleared (e.g., based on how the counts were processed between the last read cycle, the count space bit will be set if in negative count space, or cleared if in positive count space). At state 216, the count registers and direction bit are cleared. At state 218, the interrupt mask is cleared (enabling the count engine 104 to service interrupts).

At state 220, the output port is setup for outputting data. At state 222, the high register (the upper counter word) is transferred to the count processor 104 output port. At state 224, a data ready bit is set to indicate that the high register data at the output port is ready to be read, and the processor may then read the high register data. At state 226, the process waits to receive a low register request from the main processor 106. When the request is received, the process proceeds to state 228, and the data ready bit is cleared. At state 230, the low register (the lower counter word) is transferred to the count processor 104 output port. At state 232, the data ready out bit is set, indicating the data is ready to be read, and the processor may then read the low register data. At state 234, the process determines if the data request is finished. If the data request is finished, the process proceeds to state 236. Otherwise, the process proceeds back to state 230. At state 236, the output port is cleared, and the data ready bit is cleared. The process then loops back to state 206.

Figures 1, 3:
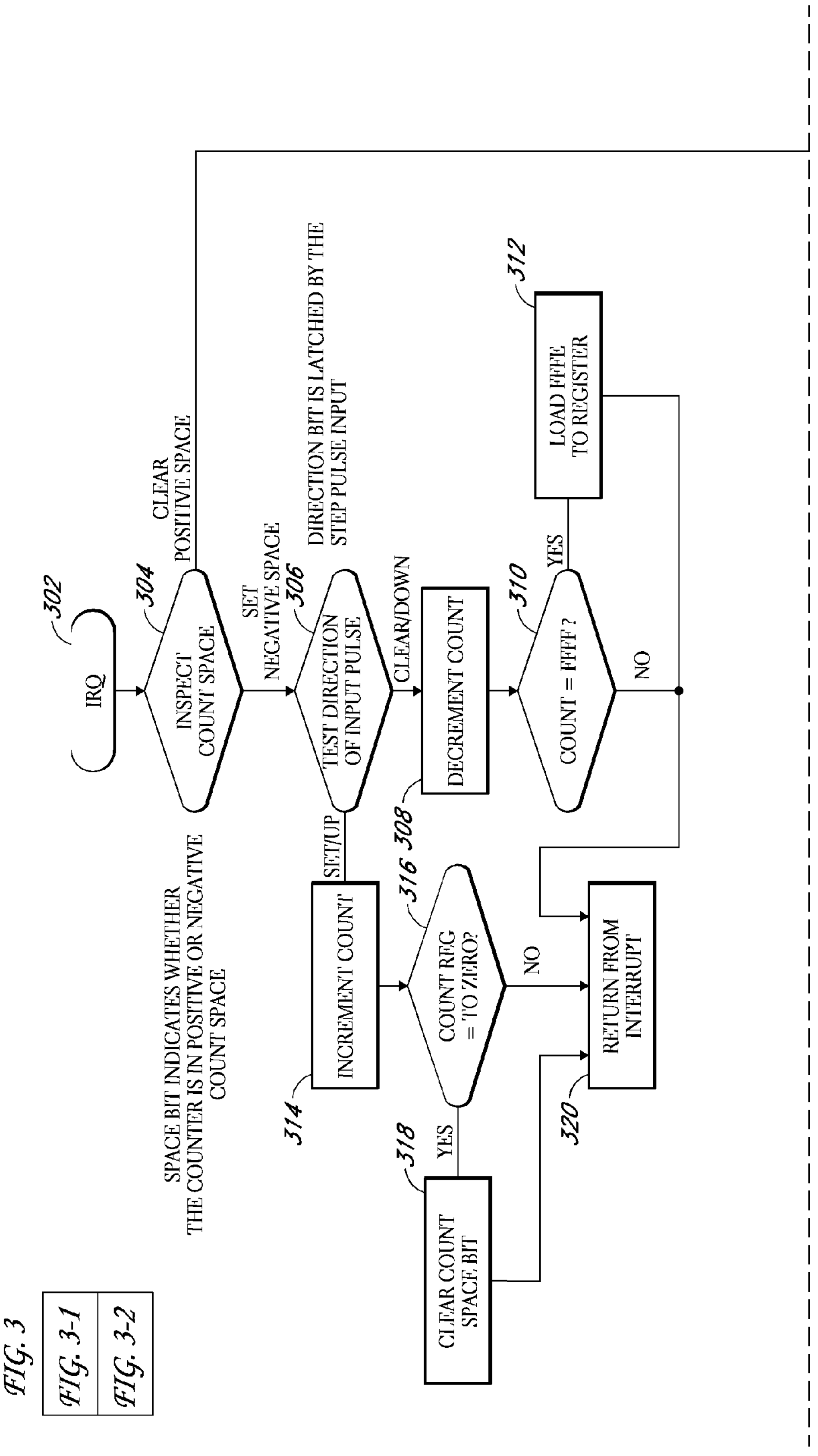
FIG. 3 illustrates an example count engine interrupt service routine is illustrated.
Figures 2, 3:
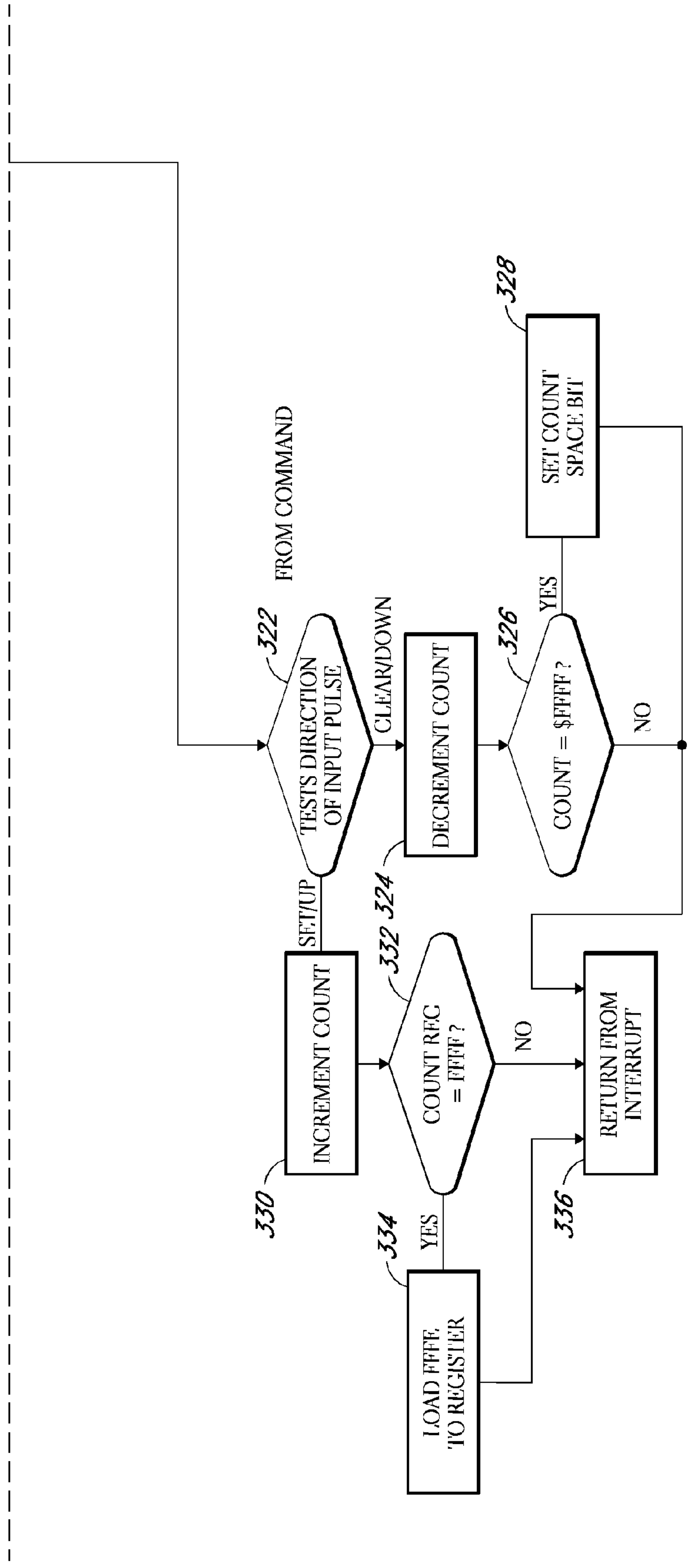

Referring now to FIG. 3, an example count engine interrupt service routine is illustrated. At state 302, an interrupt is received from the main processor 106. At state 304, the count space bit is examined to determine whether the counter is in negative (down) or positive (up) count space. If the count space bit is in positive space, the process proceeds to state 322. If the count space direction bit is negative, the process proceeds to state 306 and the direction of the input pulse is determined. If, at state 306, a determination is made that the step direction input bit indicates that the count is in down direction, the process proceeds to state 308, otherwise the process proceeds to state 314.

At state 308, the count is decremented 1 count. A determination is made at state 310, whether the count has reached a threshold count (e.g., FFFF) indicating a rollover condition is about to occur. If the threshold count has not been reached, the process proceeds to state 320, and a return from interrupt is performed. If the threshold count has been reached, the count value (optionally an adjusted count value (e.g., FFFE) to accommodate operational needs of the motion processor 108) is loaded to the register at state 312. The process then proceeds to state 320, and a return from interrupt is performed.

If, at state 306, the step input direction bit indicates that the counter direction is up, the process proceeds to state 314, and the count is incremented by one count. A determination is made at state 316 as to whether the count has reached the zero point rollover, where a minimum count (e.g., 0) indicated a rollover condition has occurred. If the minimum count has not been reached, the process proceeds to state 320, and a return from interrupt is performed. If the minimum count has been reached, the count space bit is cleared at state 318. The process then proceeds to state 320, and a return from interrupt is performed.

As discussed above, if, at state 304, the count space bit is in positive space, the process proceeds to state 322 and the input pulse direction is determined. If the pulse direction is in the down domain, the process proceeds to state 324, and the count is decremented. At state 326, a determination is made as to whether the count is at a minimum count (e.g., $FFFF). If the count is at a minimum count, the process proceeds to state 328, and the count space bit is set, indicating the transition to negative count space, and the process then proceeds to state 336, and a return from interrupt is performed. If, at state 322, the input pulse direction is in the up direction, the process proceeds to state 332 and determination is made as to whether the count has reached a threshold count (e.g., FFFF). If the threshold count has not been reached, the process proceeds to state 336, and a return from interrupt is performed. If the threshold count has been reached, the count value (optionally an adjusted count value (e.g., FFFE) to accommodate operational needs of the motion processor 108) is loaded to the register at state 334. The process then proceeds to state 336, and a return from interrupt is performed.

Figures 1, 5:
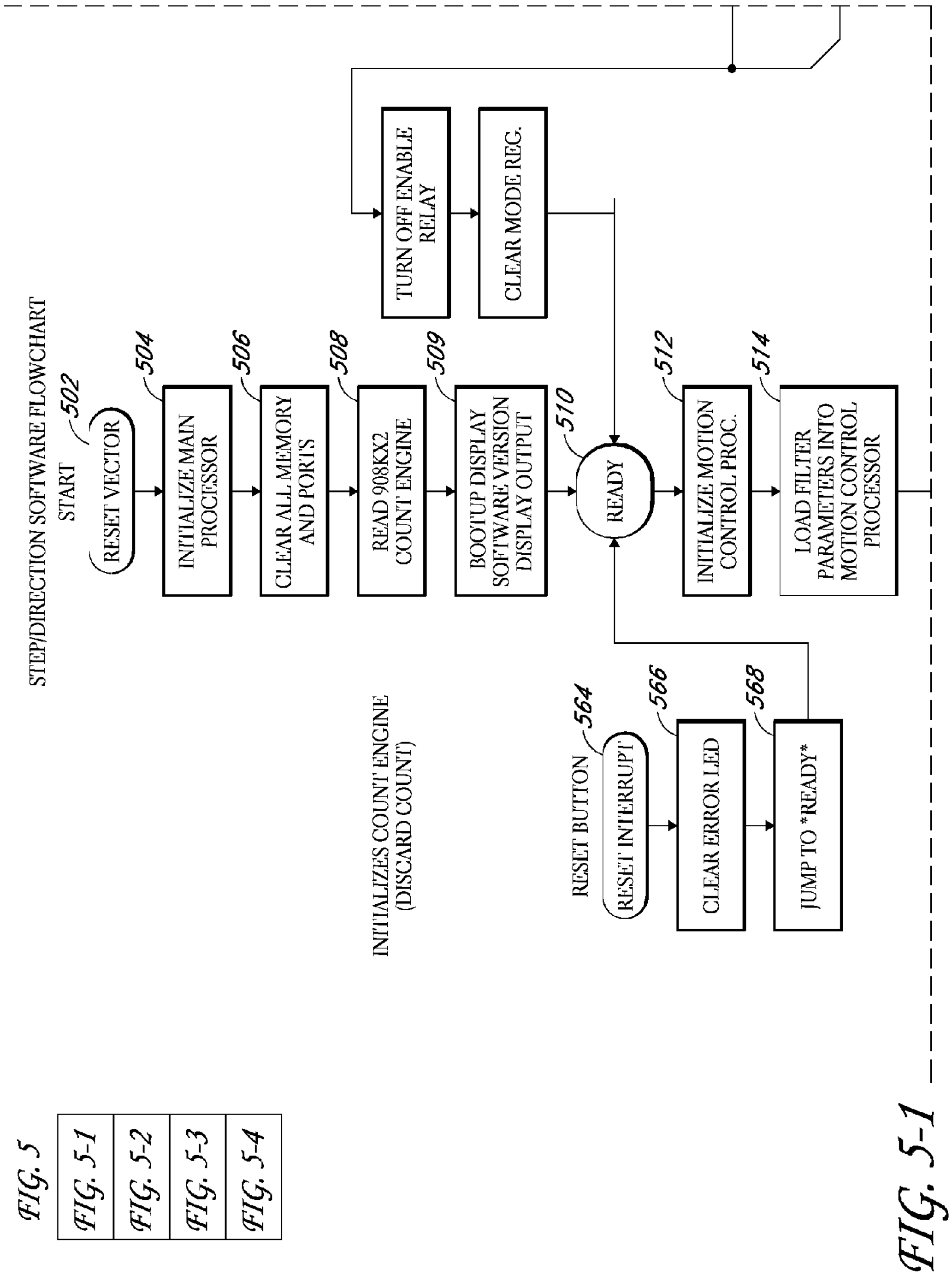
FIG. 5 illustrates an example control system operation process.
Figures 2, 5:
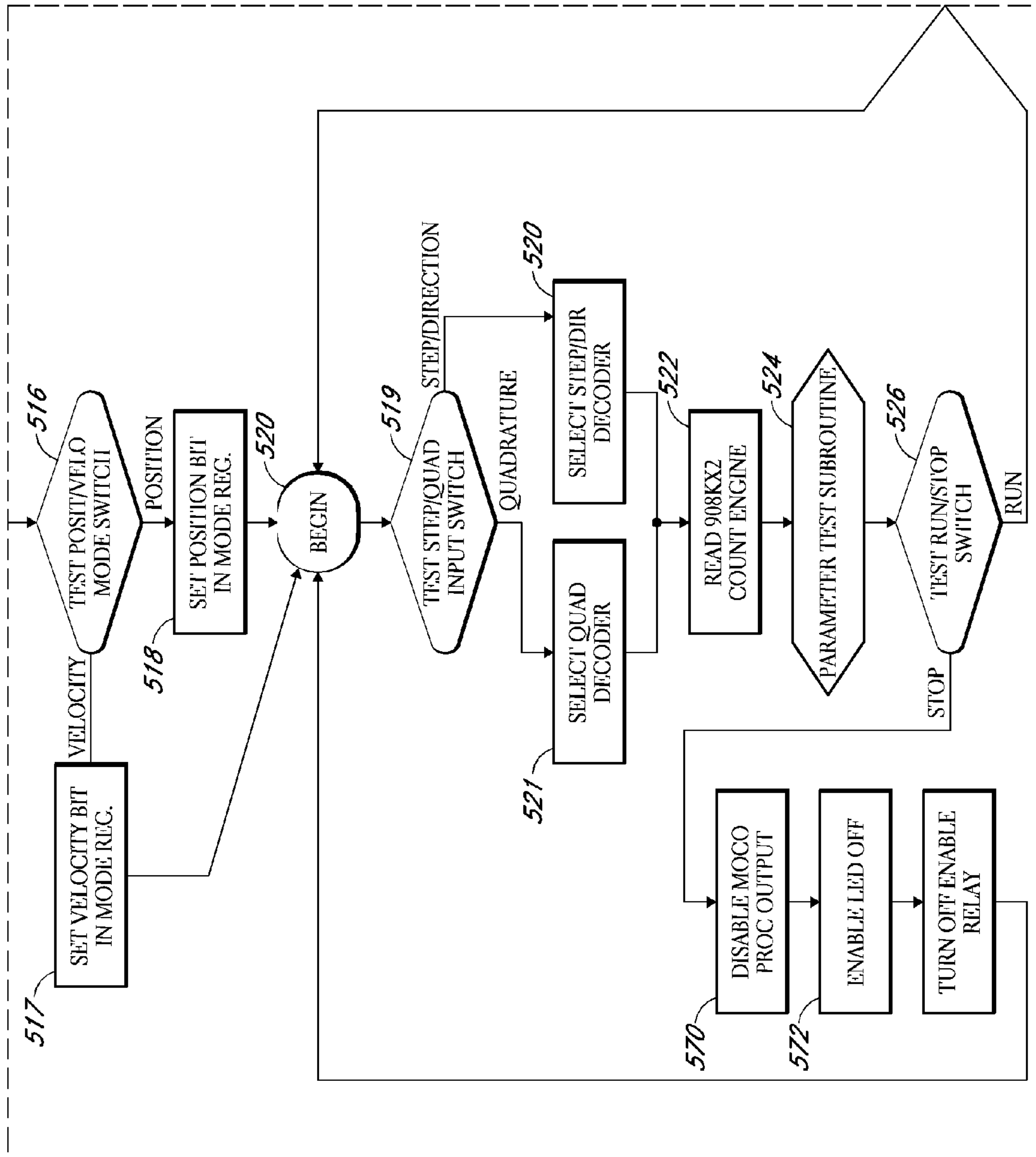
Figures 3, 5:
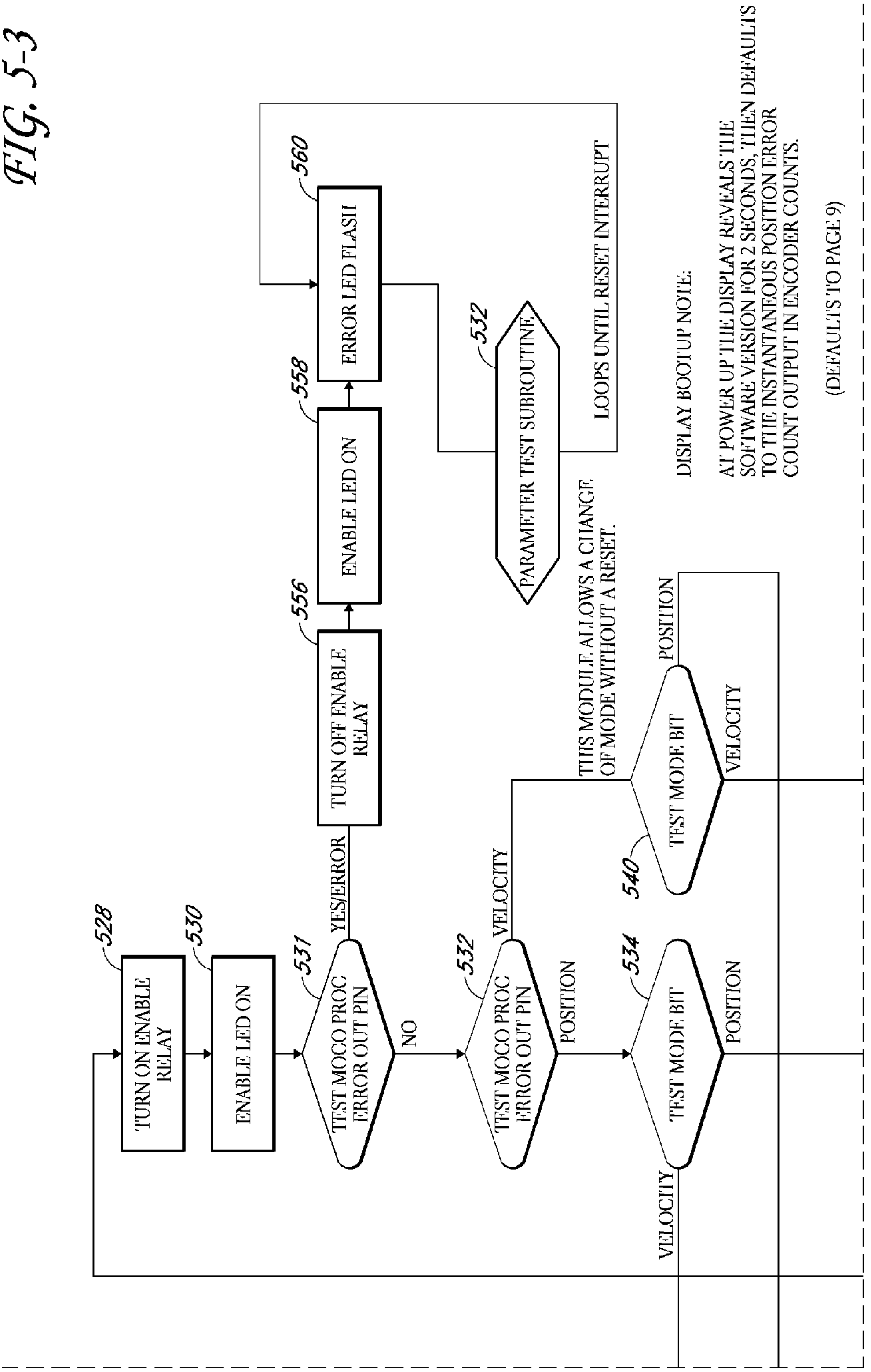
Figures 4, 5:
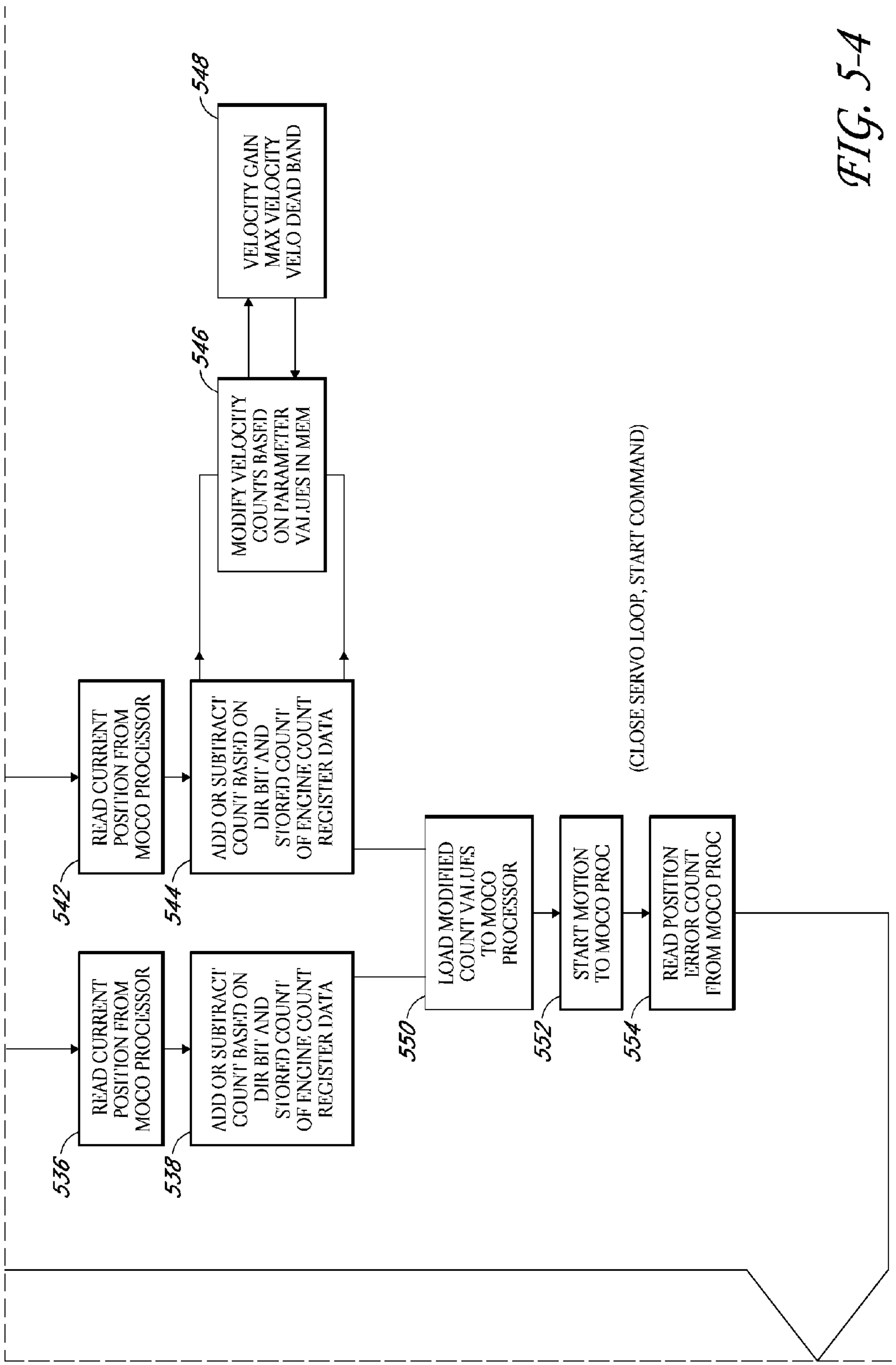

FIG. 5 illustrates an example control system operation process. At step 502, a reset vector is used to reset ports and address boot code. At state 504, the main processor 106 is initialized. At state 506, the main processor memory is cleared (e.g., by writing all zeros or ones to the memory locations), and the ports are cleared. At state 508, the count engine count is initialized (e.g., by the main processor 106 performing a read operation on the count processor 104, wherein the initially read count is discarded/not utilized). At state 509, the display software is booted up and the software version and/or errors are displayed to the user via a system display (e.g., a LED or LCD segment display, a dot matrix display, or other displayed type). At state 510, the main processor 106 and count processor 104 are ready. At state 512, the motion control processor 108 is initialized (e.g., via a reset operation). The main processor 106 reads the motion control processor registers to make ensure the motion control processor 108 booted up properly.

At state 514, the filter parameters are loaded by the main processor 106 into the motion control processor 108. At state 516, the position/velocity control is read. If the position/velocity control indicates that the system is to operate in position mode, the process proceeds to state 518, and the position bit is accordingly set in a mode register. If the position/velocity control indicates that the system is to operate in velocity mode, the process proceeds to state 517, and the position bit is accordingly set in the mode register.

At state 519, the step/quadrature input switch is read. If the user has selected step/direction as the input, the process proceeds to state 520, and the count engine step/direction decoder is selected. If the user has selected quadrature as the input, the process proceeds to state 521, and the count engine quadrature decoder is selected.

At state 522, the count engine 104 is read by the main processor 106 (e.g., the count and direction bit) to determine the commanded count value. At state 524, a parameter subroutine is executed which reads the parameter values discussed above. At state 526, the process waits for a run or stop command (e.g., user activated via a corresponding switch or otherwise). If a stop command is received, the process proceeds to state 570, and the motion control processor output is disabled (e.g., is commanded to a relative position of "0" or a velocity of zero if in velocity mode), to prevent further motor motion. At state 572 an enable indicator is turned off, to indicate that the system is in a "stop" state, and the enable relay is turned off.

If at state 526, a run command is received, the process proceeds to state 528, and the enable relay(s) (e.g., for the valve and/or the PWM drive) are turned on, thereby enabling the relays. At state 530, a human perceptible enable indicator is activated (e.g., a lamp).

At state 531, and the motion control processor error output is monitored (e.g., indicating a position error, which may occur if the number of received pulses exceed a specified count threshold, wherein the main processor 106 specifies to the motion control processor which errors are to generate an interrupt). If an error condition exists, the process proceeds to state 556, and the power relay is turned off, thereby preventing further motion. At state 558, the enable indicator is turn off. At state 560, an indicator error light is activated (e.g., flashing/blinking). At state 562, the parameter test subroutine is performed, and the process continues looping back to state 560 until a reset interrupt is detected.

If, at state 531, an error condition is not detected, the process proceeds to state 532 and the position/velocity mode control is examined. If the user has selected velocity to be used as a command, the process proceeds to state 534. At state 534, the position/velocity mode bit is examined to determine if the user has changed modes. If the user has not changed modes, and the commanded mode is still the position mode, the process proceeds to state 536. If the user did change modes, the enable relay is turned off, the mode register is cleared, and the process returns to read state 510.

At state 536, the motor's current position is read from the motion control processor 108 (e.g., the absolute position as measured relative to a start position). At state 538, the main processor 106 adds or subtracts to/from the count based on the direction bit and the stored count. At state 550, the modified count value calculated at state 538 is written to the motion control processor 108 to close the servo loop and to command position at state 552. At state, 554, the error count is read from the motion control processor 508 by the main processor 506, and the process proceeds back to state 520.

If, at state 532 the position/velocity mode control indicates the user has selected velocity to be used as a command, the process proceeds to state 540. At state 540, the position/velocity mode bit is examined to determine if the user has changed modes. If the user has not changed modes, and the commanded mode is still the velocity mode, the process proceeds to state 542. If the user did change modes, the enable relay is turned off, the mode register is cleared, and the process returns to read state 510.

At state 542, the motor's current velocity is read from the motion control processor 108. At state 544, the processor 106 adds or subtracts to/from the count based on the direction bit and the stored count. The velocity count is modified based on the stored parameter values at state 546 (e.g., the velocity gain, maximum velocity, and velocity dead band, see 548) to close the servo loop and to command position. The process proceeds to state 550.

The processes and systems described herein can be used in some or all of the following systems and applications:

Motion Picture visual effects gimbals rotators (e.g., wherein the gimbals are coupled to hydraulic motors controlled as described herein), such as linear track actuators controlling large loads, precision winches for flying stunt players and cars/trucks, cranes and arms, overhead gantry flying assemblies, etc.;

Theatrical platforms, elevators (e.g., wherein the platforms/elevators are coupled to hydraulic motors controlled as described herein);

Live stage effects, lifts (e.g., wherein the lifts, arms, etc., are coupled to hydraulic motors controlled as described herein);

Theme park attractions such as live set piece positioning, precision control of large loads, cars tracked vehicles;

Large or small animatronic effects;

Construction equipment, cranes (e.g., wherein the cranes, shovels, etc., are coupled to hydraulic motors controlled as described herein);

Industrial process equipment, such as multi-wheeled hydraulic conveyors, tracked actuators, rotating platforms, synchronized rotating applications, etc.;

Flight simulators (e.g., wherein the "aircraft" and/or seat are coupled to hydraulic motors controlled as described herein);

Aircraft support equipment such as conveyors, equipment lifts, baggage handling conveyors, etc.;

Mining equipment such as tracked transport equipment, tunneling vehicles, synchronizable lifts, winches, synchronized boring gear;

Turntables;

Elevators;

Winches;

Rack and pinion mechanisms;

Crane turrets;

Hydrostatic drives;

Multi-wheel drives;

Conveyor belt drives;

Industrial process equipment;

Other positional servo-hydraulic systems.

Thus as described above, certain example embodiments enable the accurate control of a hydraulic actuator using step/direction commands, such as those used for stepper motor control. Further, certain embodiments can be controlled via position and/or velocity commands. Thus, for example, certain embodiments enable a stepper motor type control system to be used to operate a hydraulic motor with high precision, optionally using relatively large number of steps with relatively small step increments.

While the foregoing detailed description discloses several embodiments of the present invention, it should be understood that this disclosure is illustrative only and is not limiting of the present invention. It should be appreciated that the specific configurations and operations disclosed can differ from those described above.

What is claimed is:

1. A hydraulic motor control system, comprising:

a first input configured to receive a digital step/direction command signal;

a second input configured to receive a position signal from a continuous turn motor position sensor;

a processing system configured to control a hydraulic servo valve based at least in part on the step/direction command signal and the position signal; and a reset circuit configured to disable valve relays during a reset process to thereby disable the hydraulic motor.

2. The hydraulic motor control system as defined in claim 1, further comprising a hydraulic servo valve enable output configured to be coupled to the hydraulic servo valve.

3. A hydraulic motor control system, comprising:

a first input configured to receive a digital step/direction command signal;

a second input configured to receive a position signal from a continuous turn motor position sensor;

a processing system configured to control a hydraulic servo valve based at least in part on the step/direction command signal and the position signal; and a control via which a user can select between a velocity mode and a position mode via a user accessible key, button or switch.

4. The hydraulic motor control system as defined in claim 1, further comprising a user accessible interface via which a user can specify one or more proportional-integral-derivative loop tuning parameters.

5. The hydraulic motor control system as defined in claim 1, further comprising a count engine and a motion control processor.

6. The hydraulic motor control system as defined in claim 1, further comprising a quadrature signal input configured to receive position and/or velocity commands via a quadrature signal.

7. The hydraulic motor control system as defined in claim 1, further comprising a count circuit configured to count step pulses received via the first input.

8. The hydraulic motor control system as defined in claim 1, further comprising a count circuit configured to count pulses received via a quadrature signal input.

9. The hydraulic motor control system as defined in claim 1, further comprising a position/velocity selection control.

10. The hydraulic motor control system as defined in claim 1, wherein the motor position sensor is an incremental optical encoder providing a quadrature signal.

11. The hydraulic motor control system as defined in claim 1, wherein the motor position sensor is a magnetic sensor.

12. The hydraulic motor control system as defined in claim 1, further comprising the hydraulic servo valve.

13. The hydraulic motor control system as defined in claim 1, further comprising the hydraulic motor and a gimbal, elevator, crane and/or stage coupled to the hydraulic motor.

14. A hydraulic motor control system, comprising:

a first input configured to receive a digital step/direction command signal;

a second input configured to receive a position signal from a continuous turn motor position sensor;

a processing system configured to control a hydraulic servo valve based at least in part on the step/direction command signal and the position signal; and a relay enable output configured to be coupled to a safety lock valve.

15. A hydraulic motor control system, comprising:

a first input configured to receive a digital step/direction command signal;

a second input configured to receive a position signal from a continuous turn motor position sensor;

a processing system configured to control a hydraulic servo valve based at least in part on the step/direction command signal and the position signal; and a control via which a user can select between using a quadrature source and a step direction source for controlling the motor control system.

16. A method of controlling a hydraulic motor, comprising:

receiving step command pulses;

keeping a count of the step command pulses;

receiving position information from a position sensor coupled to a hydraulic motor;

using the count of step pulses and the position information to control a hydraulic servo valve coupled to the hydraulic motor, to thereby at least partly control the hydraulic motor; and operating the hydraulic motor in position mode or velocity based on a user mode command.

17. The method as defined in claim 16, wherein the step command pulses are received from a programmable logic controller.

18. The method as defined in claim 16, wherein the position sensor is a continuous turn position sensor.

19. The method as defined in claim 16, wherein the position sensor is an incremental continuous turn position sensor.

20. The method as defined in claim 16, wherein the position sensor is a continuous turn position sensor including an optical encoder that converts angular position to an electrical signal.

21. The method as defined in claim 16, wherein the position sensor is a continuous turn position sensor including is a magnetic sensor that converts angular position to an electrical signal.

22. The method as defined in claim 16, the method further comprising counting pulses from the position sensor to determine at least in part the motor position.

23. The method as defined in claim 16, the method further comprising receiving one or more user specified proportional-integral-derivative loop tuning parameters which are used in controlling the hydraulic motor.

24. The method as defined in claim 16, the method further comprising controlling a hydraulic servo valve enable signal coupled to the hydraulic servo valve.

25. A method of controlling a hydraulic motor, comprising:

receiving step command pulses;

keeping a count of the step command pulses;

receiving position information from a position sensor coupled to a hydraulic motor;

using the count of step pulses and the position information to control a hydraulic servo valve coupled to the hydraulic motor, to thereby at least partly control the hydraulic motor; and causing a hydraulic servo valve enable signal coupled to the hydraulic servo valve to be placed in a disable state during a reset operation.

26. A method of controlling a hydraulic motor, comprising:

receiving step command pulses;

keeping a count of the step command pulses;

receiving position information from a position sensor coupled to a hydraulic motor;

using the count of step pulses and the position information to control a hydraulic servo valve coupled to the hydraulic motor, to thereby at least partly control the hydraulic motor; and controlling a hydraulic servo valve enable signal coupled to a safety lock valve.

27. Computer executable code stored in a computer readable memory, that when executed by a device is configured to cause the device to:

receive a count of step command pulses;

receive position information from a continuous turn incremental position sensor coupled to a hydraulic motor;

use the count of step pulses and the position information to control a hydraulic valve coupled to the hydraulic motor, to thereby at least partly control the hydraulic motor; and control a hydraulic valve enable signal coupled to a safety lock valve.

28. The code as defined in claim 27, wherein the code is further configured to process step command pulses from a programmable logic controller.

29. The code as defined in claim 27, wherein the code is further configured to determine motor position using incremental position sensor data.

30. The code as defined in claim 27, wherein the code is further configured to determine motor position using absolute position sensor data.

31. The code as defined in claim 27, wherein the code is further configured to determine a motor shaft angular position using the position information.

32. The code as defined in claim 27, wherein the code is further configured to count pulses from the position sensor to determine at least in part the motor position.

33. The code as defined in claim 27, wherein the code is further configured to operate the hydraulic motor in position mode or velocity based on a user mode command.

34. The code as defined in claim 27, wherein the code is further configured to utilize one or more user specified proportional-integral-derivative loop tuning parameters in controlling the hydraulic motor.

35. The code as defined in claim 27, wherein the code is further configured to control a hydraulic valve enable signal coupled to the hydraulic valve.

36. Computer executable code stored in a computer readable memory, that when executed by a device is configured to cause the device to:

receive a count of step command pulses;

receive position information from a continuous turn incremental position sensor coupled to a hydraulic motor;

use the count of step pulses and the position information to control a hydraulic valve coupled to the hydraulic motor, to thereby at least partly control the hydraulic motor; and cause a hydraulic valve enable signal coupled to the hydraulic valve to be placed in a disable state during a reset operation.

* * * * *